United States Patent [19]

Palfi et al.

[11] 3,801,964

[45] Apr. 2, 1974

[54] SEMICONDUCTOR MEMORY WITH ADDRESS DECODING

[75] Inventors: Thomas Laszlo Palfi, Cupertino; James Millard Oliphant, San Jose, both of Calif.

[73] Assignee: Advanced Memory Systems Inc., Sunnyville, Calif.

[22] Filed: Feb. 24, 1972

[21] Appl. No.: 229,144

[52] U.S. Cl. .............. 340/173 R, 307/205, 307/238, 307/239, 340/173 FF

[51] Int. Cl. .............. G11c 7/00, G11c 7/06

[58] Field of Search .............. 340/173 FF, 173 R; 307/238, 205, 239

[56] References Cited

UNITED STATES PATENTS

| | | | |
|---|---|---|---|
| 3,609,712 | 9/1971 | Dennard | 340/173 FF |
| 3,641,511 | 2/1972 | Cricchi | 340/173 FF |
| 3,688,264 | 8/1972 | Dingwall | 340/173 FF |
| 3,706,975 | 12/1972 | Paluck | 340/173 FF |

*Primary Examiner*—Vincent P. Canney
*Assistant Examiner*—Stuart Hecker
*Attorney, Agent, or Firm*—Spensley, Horn & Lubitz

[57] ABSTRACT

A dynamic semiconductor memory, including a memory addressing system, using field effect devices, for rapidly decoding an address signal, for addressing the memory matrix, and providing a differential output on a pair of sense lines in accordance with the state of the addressed memory cell. The system is comprised of three basic addressing circuits operating in conjunction with a reset signal and clock signal to address one of the memory cells in the memory. The first circuit generates a $\overline{\text{reset}}$ signal which is the modified inverse of the reset signal for use in the second circuit. The second circuit is an address inverter, used in plurality, each of which presents one bit of the multiple bit address together with an inverse thereof, and serves as a register for the signal for application to the decoder circuit. The third circuit is a decoder circuit, used for each row and each column of the memory matrix, which receives the address and/or $\overline{\text{address}}$ signal and provides a clocked, decoded address signal output. The decoded row address couples each memory cell in the respective row to a pair of precharged column cell lines, and the decoded column address couples one respective pair of the column cell lines to the sense lines, whereby a chip select signal (the column "clock" signal) may be used to couple the sense lines to the I/O (input-output) lines. Refresh and write operations are described.

11 Claims, 14 Drawing Figures

SEMICONDUCTOR MEMORY WITH ADDRESS DECODING

This application contains a cross reference to a copending patent application entitled, "High Speed Sense Amplifier" invented by Robert C. Lutz and Jerald Bernacchi, filed Jan. 31, 1972.

BACKGROUND OF THE INVENTION

1. Field of the Invention

The present invention relates to the field of memory circuits, and particularly to integrated memory circuits utilizing field effect devices.

2. Prior Art

Memory matrices using various types of data storage cells are well known in the prior art, as are various means for addressing the memory. The different types of memory storage devices generally each have their own addressing requirement as to current voltage levels, speed, etc., and therefore particular addressing circuitry is generally designed to provide the required decoded addressing signal for the particular type of memory device.

Of particular interest to the present invention are what are commonly referred to as MOS type memories. The designation MOS technically stands for a field effect device having a metal gate insulated from the silicon substrate by an oxide layer. More recent developments in the field have included silicon gate devices and may further include an insulating layer such as silicon nitride as opposed to an oxide layer. Thus, the term MOS, as may be used herein, is used in the general or generic sense to indicate the general class of devices which may be otherwise referred to as field effect devices, insulated gate devices and/or surface effect devices. Similarly, terms such as insulated gate devices, field effect devices, etc., are used herein to also indicate this broad category of devices. Such devices are usually physically characterized as having first and second regions of a first conductivity type separated by an intermediate region of the second conductivity type, over which there is a conductive gate electrically separated or insulated from the intermediate region. By applying a voltage of the proper polarity to the gate, the surface of the intermediate region is effectively caused to change conductivity type between the first and second regions. Thus, the gate is characterized as being substantially insulated from the substrate, though having a significant capacitance both with respect to the first and second regions, and particularly with respect to the substrate. The conductivity between the first and second regions is a function of the gate voltage. Because of the extremely high DC impedance of the gate and the significant capacitance thereof, as well as capacitance associated with the various lines and other circuit components connected to the gate and first and second regions, the gate of such a device will tend to remain at a given voltage differential with respect to the first and second regions until driven to a second voltage differential, at least within a relatively short time period characteristic of memory access and read/write times.

MOS memories characteristically are comprised of memory cells of flipflop circuits generally arranged so as to store data as a result of stored charges in the MOS devices and the various interconnections thereto. The memory is periodically refreshed by increasing the voltage supplied thereto so as to replenish the charges before the state of the flip flop becomes indeterminate.

In order to make maximum use of a given memory capacity it is required to read data out of the memory and write data into the memory as quickly as possible. The reading and writing time periods for data must allow for addressing, and is generally limited by propogation times existing within the addressing system and by the time required to read or write information once a particular memory cell has been addressed. The propogation times in turn are principally due to the time required to charge and discharge the various capacitances in the circuitry, as required, to change the conduction state of the various devices therein. By way of example, a line connected to the gate of an MOS device may have substantial capacitance thereon, as well as the capacitance of the gate itself, and a significant time is required, depending upon the impedance of the driver, to charge and discharge these capacitances to change the conduction state of the device. Also, in general, it is necessary that addressing be complete before information is written into or read out of the memory. Consequently, in prior art memory addressing systems, generally the address is presented to the addressing system and decoded before the read or write operation is initiated by a clock signal, and remains throughout the duration of the read/write operation. Thereafter, the addressing is changed as required and after the necessary delay time a subsequent read or write operation is initiated. Furthermore, the circuitry generally used in the addressing system generally is of the conduction state type, rather than the charge storage type, that is to say, various operational signals, such as the decoded address, etc., persist only so long as the conduction of various devices determining the state persists, as opposed to the setting of the state of various functional signals followed by the decoupling of those signals from those original signals upon which that state was determined, and maintaining the desired functional signal by the stored charges within the various devices while the signals upon which they depended are changed so as to coincide with the address for the next read/write operation, as in the present invention. Thus, prior art memories and memory addressing systems tend to utilize a series type operation, that is, receive an address, decode, read or write, receive the next address, decode, read or write, etc., as opposed to the storing of a decoded address during a read/write operation while a new address may be presented during the read or write operation for rapid decoding before the next clock signal initiating the next read/write operation.

BRIEF SUMMARY OF THE INVENTION

A semiconductor memory and memory addressing system using field effect devices for rapidly decoding an address signal and addressing the memory matrix. The addressing system is comprised of three basic unique circuits operating in conjunction with a reset signal and a clock signal to address the memory. The first circuit operates on a reset and clock signal and generates a $\overline{\text{reset}}$ signal which is a modified inverse of the reset signal. The second circuit is an address inverter which is used in plurality to provide signals which are a modified inverse of the multiple bit address signal in response to an input comprising the address signal and the $\overline{\text{reset}}$ signal. The address inverter circuit serves as a register in that the address and $\overline{\text{address}}$ signals are decoupled from the inverter input and capacitively stored until reset by the reset signal, allowing presentation of the next address before the completion of a read/write operation. The third circuit is a decoder circuit used for each row and each column of the memory matrix and which receives the address and/or $\overline{\text{address}}$ signals and provides a clocked, decoded address signal output. The address inverter and the decoder circuit provide for recharging of various field effect devices therein in response to the reset signal so as to provide the clocked, decoded address signal substantially immediately upon the occurrence of the clock signal. The decoded row address couples each memory cell in the respective row to a pair of precharged column cell lines, and the decoded column address couples one respective pair of the column cell lines to the sense lines, whereby a chip select signal (the column "clock" signal) may be used to couple the sense lines to the I/O (input-output) lines. Refresh and write operations are described.

DETAILED DESCRIPTION OF THE INVENTION

The present invention semiconductor memory is comprised of a matrix of semiconductor memory cells together with a unique addressing system and other supporting circuitry which cooperatively perform to provide an unusually fast read/write semiconductor memory. The entire memory disclosed herein may be fabricated on a single semiconductor chip and is primarily intended for such fabrication, though fabrication of the memory with one or more of the circuits, or their equivalent as independent circuits connected to the integrated memory is also a practical mechanization for the present invention.

Figure 1:
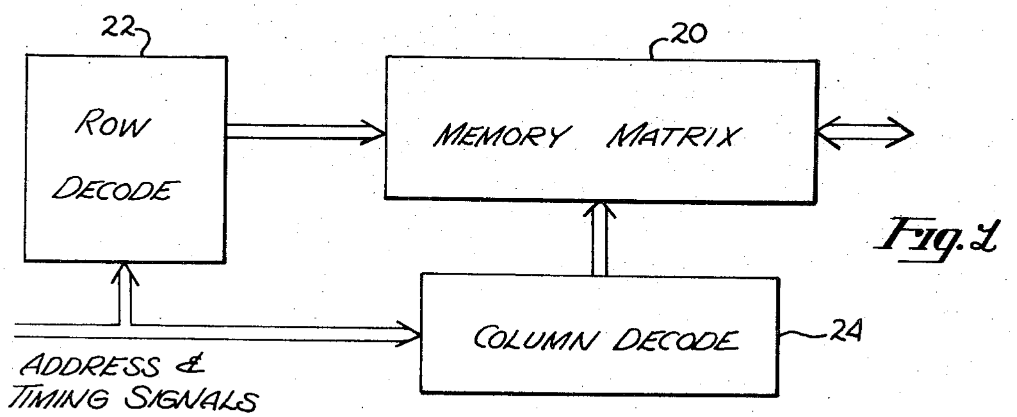
FIG. 1 is a block diagram indicating a typical memory matrix and addressing system therefor.

First referring to FIG. 1, a block diagram of a typical memory with addressing circuitry may be seen. The memory matrix 20 used in the present invention semiconductor memory is an MOS semiconductor memory cell matrix. For purposes of explanation, the present invention shall be described with respect to a 1,024 bit memory arranged in a 32 bit by 32 bit array. To address a particular cell in the memory matrix, address and timing signals are applied to the row decoding circuitry 22 and the column decoding circuitry 24. The row decoding and column decoding circuitry may each comprise the decoder of the present invention, the object of which is to select an individual memory cell from the memory matrix, for reading or writing, in as short a time as possible in response to a parallel digital addressing signal. In addition to the binary addressing signal, there is also provided to the circuitry of the present invention signals which shall be identified as a reset signal and a clock signal. These signals, as well as others generated within the decoding circuitry, are shown in FIG. 2.

For purposes of explanation, the addressing system shall be first described in detail since the addressing system is a key portion of the memory system, and once described, a specific memory cell matrix and the other support circuitry may be readily described in relation to the signals of and interconnection with the addressing system. Thereafter, the memory cell matrix and other matrix support circuitry shall be described.

Figures 3, 4:
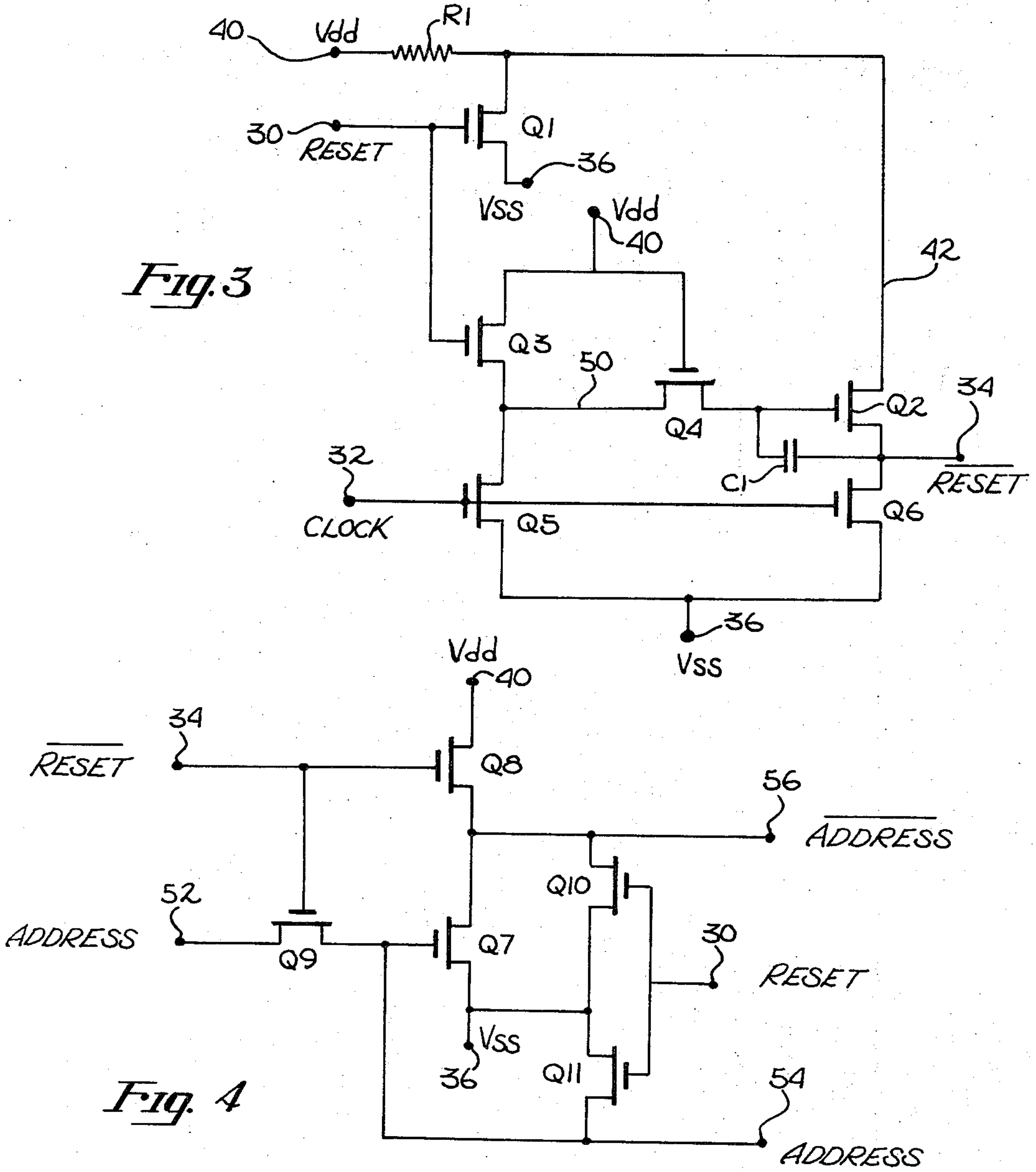
FIG. 3 is a circuit diagram of the $\overline{\text{reset}}$ generator of the preferred embodiment of the present invention.
FIG. 4 is a circuit diagram of the address inverter of the preferred embodiment of the present invention.

The reset and clock signals for a particular chip, that is, for a particular memory matrix, are applied at terminals 30 and 32 of the circuit of FIG. 3. The function of this circuit is to create a signal at terminal 34 which shall be designated as $\overline{\text{reset}}$. The designation of the signal at terminal 34 as $\overline{\text{reset}}$ is to indicate the generally inverse nature of the signal at terminal 34 compared to the signal at terminal 30, as shall be subsequently seen. (The signal at terminal 34 is further influenced by the clock signal at terminal 32, and is therefore not a true inverse of the signal at terminal 30.) Also, in the preferred embodiment of the present invention, all the circuits herein described are fabricated of P channel MOS devices, though it is to be understood that the circuits and principles of the present invention are also directly applicable to N channel devices. Using P channel devices, the power supply voltage on terminal 36 is positive with respect to the voltage on terminal 40.

Figures 2A, 2B, 2C, 2D, 2E, 2F, 2G:
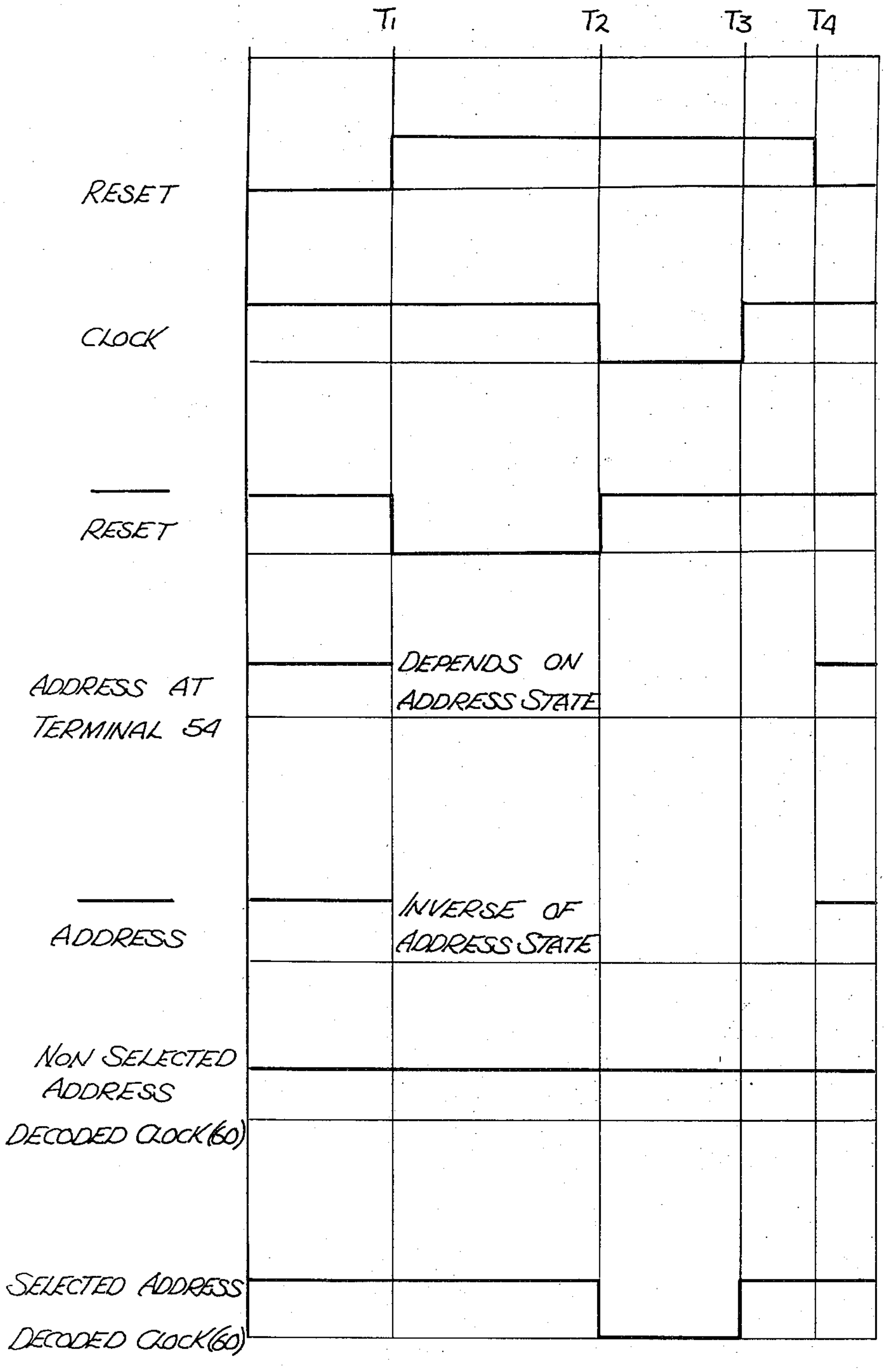
FIG. 2*a* through 2*g* are graphical presentations of the forms for various signals in the semiconductor memory of the present invention.

When the reset signal is low (e.g. approximately at the voltage Vdd of terminal 40) transistor Q1 is conductive, thereby effectively connecting line 42 to the positive supply terminal 36. Also, since the gate of device Q3 is also connected to the reset line 30, device Q3 will be conducting at this time. The gate of transistor Q4 is connected to terminal 40 (negative power supply terminal) and therefore Q4 will similarly be conducting. Thus, the gate of device Q2 will be substantially clamped at the negative power supply voltage through devices Q3 and Q4, while the source of device Q2 will be connected to the positive power supply terminal 36 through line 42 and device Q1. Consequently, the gate of Q2 is charged to the power supply voltage. Also, during this time the clock signal shown in FIG. 2*b* is high and therefore devices Q5 and Q6 are not conductive.

At time T1 the reset signal changes to the high state, thereby turning off devices Q1 and Q3. At this time resistor R1 pulls line 42 to the negative power supply voltage. Since the gate of device Q2 has a substantial capacitance with respect to the source connected to the line 42 and to the drain connected to line 34, the gate of device Q2 will maintain the approximate voltage differential between the gate and source, thereby forcing the drain, that is terminal 34, to the low state as shown in FIG. 2C. It is to be noted that the capacitor C1 is shown between the gate and drain of device Q2. In practice, the capacitor C1 is not an individual component as shown in FIG. 3, but instead is an enhanced gate to drain capacitance, caused by the construction of device Q2 so that the gate overlaps the drain region by a relatively large amount compared to field effect devices of ordinary design. Of course at this time, as may be seen in FIG. 2*b*, the clock signal is in the high state and therefore devices Q5 and Q6 are in the off condition.

When the clock signal at terminal 32 changes to the low state at time T2, devices Q5 and Q6 will both become conductive (Q3 at this time is non-conductive). Thus terminal 34 is effectively coupled to terminal 36, the positive power supply voltage, and the $\overline{\text{reset}}$ voltage as shown in FIG. 2*c* is again rapidly forced to the high state. At the same time, since Q5 and Q4 are both conductive, the gate of device Q2 is also forced to the positive power supply voltage. Thus, Q2 is non-conductive as in Q1, so that line 42 is coupled through R1 to the voltage of the low state, and is decoupled from terminal 34.

At time T3 the clock voltage returns to the high state, thereby turning off devices Q5 and Q6. At this time, or at any time thereafter, the reset signal may be changed to the low state, thereby initiating a new cycle of operation. Assuming that the reset signal on terminal 30 does not immediately change to the low state, the output on terminal 34 will remain in the high state as a result of the capacitances in the device Q2. When the reset signal returns to the low state, devices Q1 and Q3 are again conducting, thereby recharging device Q2 as well as connecting terminal 34 to the positive power supply line through devices Q1 and Q2.

The next circuit in the decoding system is an address inverter shown in FIG. 4. In a 32 by 32 memory matrix, the row address and the column address are each 5 bit coded address signals. Thus, there will be a total of 10 address bits for a full address, each of which is inverted through an address inverter of FIG. 4. Consequently, for a 32 by 32 memory matrix there will be 10 such circuits used. Various of the terminals in FIG. 4 are identified with the same number as the corresponding terminals in FIG. 3 since these terminals represent the same points or lines in an integrated circuit. Thus, the $\overline{\text{reset}}$ signal is applied at terminal 34 and the reset signal is applied at terminal 30. As before, terminals 36 and 40 are the power supply terminals. The address is applied at terminal 52 and, as shall be described herein, the address also generally appears at terminal 54 and the inverse of the address appears at terminal 56. (Of course, as to an individual address inverter circuit, as shown in FIG. 4, the address is more properly stated to be 1 bit of the parallel multiple bit address signal.)

Devices Q7 and Q8 are connected in series between the power supply terminals 36 and 40. The gate of device Q8 is connected to the $\overline{\text{reset}}$ line. The address terminal 52 is connected through device Q9 to the gate of device Q7 and to the address terminal 54. The gate of Q9 is connected to the $\overline{\text{reset}}$ terminal. Devices Q10 and Q11 are coupled between the power supply terminal 36 and the $\overline{\text{address}}$ terminal 56, and terminal 36 and address terminal 54, respectively. Thus, when the reset signal is in the low state, the address at terminal 54 and $\overline{\text{address}}$ at terminal 56 are both substantially at the positive power supply voltage. Also, device Q7, by design, is caused to have approximately 1/10 the impedance of device Q8 when both devices are conductive. Therefore, whenever device Q7 is conductive, the output at the $\overline{\text{address}}$ terminal 56 will be approximately the voltage of terminal 36, independent of the state of conduction of device Q8.

Before time T1 the reset signal at terminal 30 is in the low state, and thus both the address signal at terminal 54 and $\overline{\text{address}}$ signal at terminal 56 are in the high state (e.g. coupled to the positive power supply terminal 36). Also during this time the $\overline{\text{reset}}$ signal at terminal 34 is in the high state, and thus device Q9 is nonconductive. Consequently, any address signal may be applied to terminal 52 without being coupled to either the address terminal 54 or to the gate of device Q7.

At time T1 the reset signal at terminal 30 changes to the high state, thereby turning off devices Q10 and Q11. At the same time, the $\overline{\text{reset}}$ signal at terminal 34 changes to the low state, thereby turning on devices Q8 and Q9. Thus, the address signal applied at terminal 52 is directly coupled to terminal 54, which may be either in the high state or the low state, depending upon the address applied at that time (FIGS. 2d and 2e). If the address applied at terminal 52 is in the high state, device Q7 will be non-conductive and therefore device Q8, which is conductive and is coupled to the negative power supply terminal, will force the $\overline{\text{address}}$ signal at terminal 56 to the low state. On the other hand, if the address signal at terminal 52 is in the low state, device Q7 will also be conductive, and as previously explained, will couple the $\overline{\text{address}}$ terminal 56 to the positive power supply terminal 36, thereby forcing the $\overline{\text{address}}$ signal to the high state. Thus, at this time the address appearing at terminal 54 is the address at terminal 52, and the $\overline{\text{address}}$ signal at terminal 56 is the inverse of that address.

At time T2 the $\overline{\text{reset}}$ signal at terminal 34 changes to the high state. This turns off device Q9 and device Q8. However, the output at the address terminal 54 and at the $\overline{\text{address}}$ terminal 56 will remain at their preestablished states due to the associated capacitances on both lines. Consequently, the signals at these two terminals will persist until the occurrence of the next reset signal which, for purposes of explanation, is shown in FIG. 2a as occurring at time T4. Thus, at time T4 the signals at terminals 54 and 56 return to the high state, awaiting the next change in the reset signal equivalent to the change at the time T1.

The address inverter circuit hereabove explained has several unique characteristics. The address capacitance is divided into two parts, namely, (*a*) the package capacitance and the drain capacitance of device Q9, and (*b*) the input capacitance of device Q1 and the address line capacitance connected to terminal 52. Since the address driver, that is device Q9, is not activated when the reset signal is low, the circuitry providing the address signal is required only to switch the capacitance identified under part (*a*) above. When the reset signal is activated, the capacitances listed under part (*b*) will obtain their charges from the previously charged points. This reduces the effective input capacitance of the device by a factor of two.

The address input to the address inverter (Terminal 52) is connected to a field effect transistor drain. Thus, there is no requirement for protective devices. Also, the circuit only requires proper address input during the periods when the $\overline{\text{reset}}$ signal is in the low state, and then capacitively stores the address until the next memory cycle. Thus, the circuit functions as an address register and the address signal applied at terminal 52 may be changed to the next address signal at any time after T2, thereby allowing recharging of the address line without effecting the address and $\overline{\text{address}}$ outputs at terminals 54 and 56. Furthermore, there is no power dissipation in the address inverter except during the period in which the reset signal is in the low state. This results in a very low power dissipation during operation and no power requirement for standby mode.

Figures 5, 6:
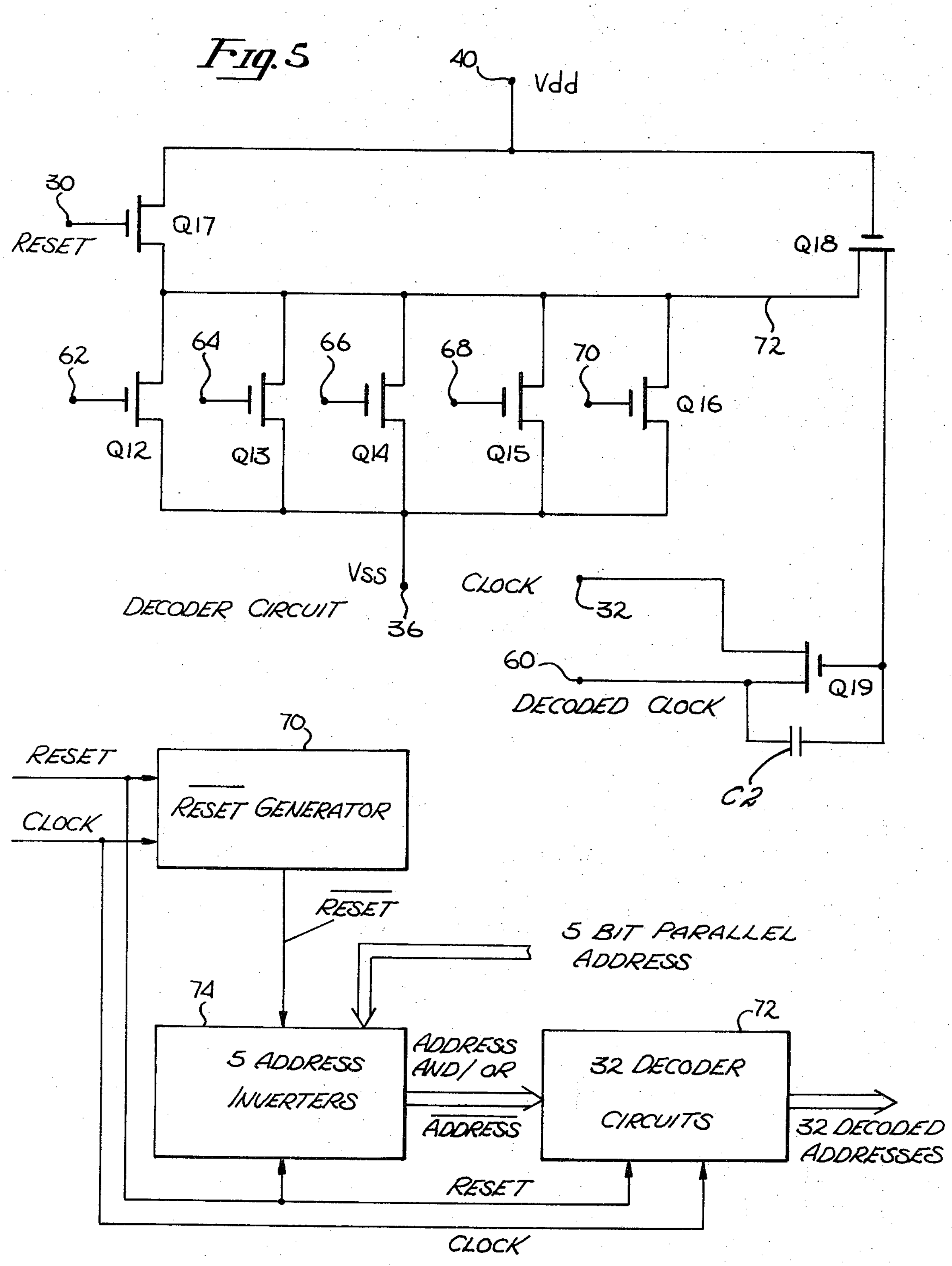
FIG. 5 is a circuit diagram of the decoder circuit of the preferred embodiment of the present invention.
FIG. 6 is a block diagram illustrating the interconnection of the various circuits of the preferred embodiment of the present invention to provide the row and/or column decoding system thereof.

Now referring to FIG. 5 the decoder circuit of the present invention may be seen. The decoder circuit provides a clocked decoded address signal at terminal 60. One such decoder circuit is used for each line and each column in the memory matrix, and thus in a 32 by 32 matrix 64 such circuits are used. As before, terminals 36 and 40 are connected to the positive and negative power supply terminals respectively. Terminal 30 is connected to the reset signal and terminal 32 is connected to the clock signal.

Terminals 62, 64, 66, 68 and 70 are connected to the gates of devices Q12, Q13, Q14, Q15 and Q16, respectively, which devices are coupled in parallel between the positive power supply terminal 36 and line 72. Thus, when any of terminals 62 through 70 are in the low state, the corresponding device will be conductive, and line 72 will be clamped to the positive power supply voltage. Devices Q12 through Q16 provide the basic mechanism for decoding the five bit signal applied to the circuit (of course, it is to be understood that fewer or additional devices may be provided to decode smaller or larger bit size address signals). As previously stated, there are ten address inverters for a 32 by 32 memory matrix, with five address inverters inverting the row address signal and five inverting the column address signal. For row decoding, by way of example, terminal 62 of the circuit of FIG. 5 will be connected to one of terminals 54 and 56 of the first address inverter (FIG. 4). Terminal 64 will be coupled through one of terminals 54 and 56 of the second address inverter, etc. with terminal 70 being coupled to one of terminals 54 and 56 for the fifth address inverter.

The selection of connections to terminals 54 or 56 provides the basic decoding mechanism. Thus, by way of example, the decoder circuit of FIG. 5 used on the first row may have terminals 62 through 70 connected to terminal 56 of the five corresponding address inverters. Thus, if the row address is 00000, the $\overline{\text{address}}$ signal at terminal 56 for all five address inverters will be in the high state and thus devices Q12 through Q16 will all be off. If any bit in the basic row address signal is in the high state, the output of one of the address inverters at terminal 56 will be in the low state. A corresponding one of devices Q12 through Q16 will be conductive and line 72 will be coupled to terminal 36. Thus, it may be seen that for the specific connection described, only the 00000 address will result in decoupling line 72 from terminal 36. For the second row the address might be 00001. In this case to decode that signal, the first four address inverters would have terminal 56 connected to terminal 60 through 68 and the fifth address inverter would have terminal 54 connected to terminal 70 of the decoder circuit. With this connection, only the 00001 address signal will address the second row and will address no other row. It may be seen that by a combination of connections of terminals 62 through 70 on the decoder circuit to selected terminals 54 and 56 of the address inverters, the five bit address signals may be decoded into 32 specific decoded signals.

To further explain the decoder circuit, it will be noted that the gate of device Q18 is connected to terminal 40, the negative power supply terminal, and thus Q18 is generally conductive. Device Q19 is coupled between the clock terminal 32 and the decoded clock terminal 60, which is the decoded address signal provided by the circuit. The gate of Q19 is coupled to device Q18, and capacitor C2 indicated in this figure represents the enhanced gate to source capacitance to device Q19, in the same manner as previously described with respect to device Q2 (FIG. 3).

Before time T1 the reset signal is low and thus device Q17 is conductive. At this same time, all the address and $\overline{\text{address}}$ signals are in the high state as may be seen in FIGS. 2d and 2e. Consequently, none of devices Q12 through Q16 are conductive, but devices Q17 and Q18 are both conductive. At the same time, the clock signal on line 32 is in the high state. Consequently, the gate of device Q19 is charged with respect to the source of Q19 coupled to the clock signal. Since the gate of Q19 is in the low state, Q19 will be conductive so that the decoded clock signal on line 60 will be the same as the clock signal on terminal 32. At time T1 the reset signal changes to the high state, thereby turning off device Q17. At the same time, the address and/or $\overline{\text{address}}$ signal lines to the gates 62 through 70 reflect the addressing signal. That is, to say, at least one of the gates 62 through 70 of 31 of the 32 decoder circuits will be changed to the low state. This turns on the associated devices Q12 through Q16 of that decoder circuit, coupling line 72 to the positive power supply voltage and discharging the gate of device Q19, thereby making that device non-conductive. Thus, independent of any further change in the clock signal applied at terminal 32, the thirty one decoder circuit decoded clock outputs at terminals 60 will remain in the high state due to the enhanced gate capacitance of Q19. For one of the thirty two decoder circuits, none of devices Q12 through Q16 are conductive. Thus, the gate of device Q19 of that circuit remains in the low state. Q19 remains conductive and the decoded clock signal at terminal 60 will respond to the clock signal itself. Thus, the output of thirty one decoder circuits will remain in the high state as shown in FIG. 2*f*. However, the one decoded clock signal for the decoder circuit of the selected address will be coupled directly to the clock signal and will therefore follow that signal. Thus, it may be seen that the decoded clock signal at terminal 60 is a true decoded clock signal occurring between time T2 and T3. It may also be seen that the address is presented to the decoder circuit throughout the time period between T1 and T3 and thus is substantially fully decoded by the time T2.

The decoder circuit of the present invention is unique particularly because it is fully dynamic, and further because it allows the gate of device Q19 to be operated in a voltage doubler mode to provide extra driving power. That is, either device Q19 is conductive so as to couple the clock signal on terminal 32 directly to terminal 60, or is made nonconductive by the turning on of one of devices Q12 through Q16 at a time when the output at terminal 60 is in the high state, so as to change the voltage on the gate of Q19 to the high state and to drive the voltage at terminal 60 to an even higher voltage by the capacitive coupling.

In the preferred embodiment, two clock signals are used, one for the reference signal for the rows in the memory matrix, referred to herein subsequently as the clock signal, and one for the columns, referred to hereinafter as the chip select signal for reasons which will subsequently become apparent. Two such reference signals are used, substantially identical in timing, so as to provide a chip select function and to accommodate the memory refresh operation for the memory matrix. Also, a separate $\overline{\text{reset}}$ generator is used for the columns and rows, through the function and signals provided thereby are identical. (As one alternative the $\overline{\text{reset}}$ signal may be externally generated and supplied to the addressing system, e.g. the input signals to the integrated circuit may be the clock, reset and $\overline{\text{reset}}$ signals.) The organization of the addressing system using the circuits of the present invention in conjunction with a 32 by 32 memory matrix are shown in block diagram form in FIG. 6. The diagram represents the row addressing system (e.g. clock input) but is typical of the column addressing system, also as both are substantially identical in structure and operation. Thus, the reset signal and a clock signal of FIGS. 2*a* and 2*b* are provided to a $\overline{\text{reset}}$ generator of FIG. 3, generally indicated by the block 70 in FIG. 6, and to the 32 decoder circuits 72 shown individually in FIG. 5. The reset signal is also coupled to five address inverters, each of the circuit of FIG. 4, generally indicated by the numeral 74, FIG. 6. The $\overline{\text{reset}}$ generator provides a $\overline{\text{reset}}$ signal to the five address inverters, which inverts the five bit parallel address signals applied thereto, and couples the address and/or $\overline{\text{address}}$ signals to the 32 decoder circuits in such combination as to cause the decoder circuit to selectively decode the address signal and select one of any 32 row address lines, subsequently each designated as RAL-N, (or column address lines subsequently designated by CAL-N).

The addressing system of the present invention provides for the precharging of key field effect devices throughout, so as to provide very rapid switching and thus very rapid addressing of the memory matrix. In particular, it has been found in memories fabricated in accordance with the present invention using P channel aluminum gate devices in integrated form that the reset signal need only stay in the low state for approximately 150 nanoseconds before a read cycle may be initiated by the change of the reset signal from the low state to the high state at T1. At time T1 decoding and precharging of various field effect devices begins, and has been found to be complete in a time of 20 to 70 nanoseconds depending upon the device and input conditions thereto. Thus, the clock signal initiating the read operation at time T2 may occur 20 to 70 nanoseconds after T1. Therefore, it may be seen that the total time required for addressing is on the order of 170 to 220 nanoseconds. (The reset signal may be driven to the low state at time T3, thereby immediately starting the first 150 nanoseconds time.)

Figure 7:
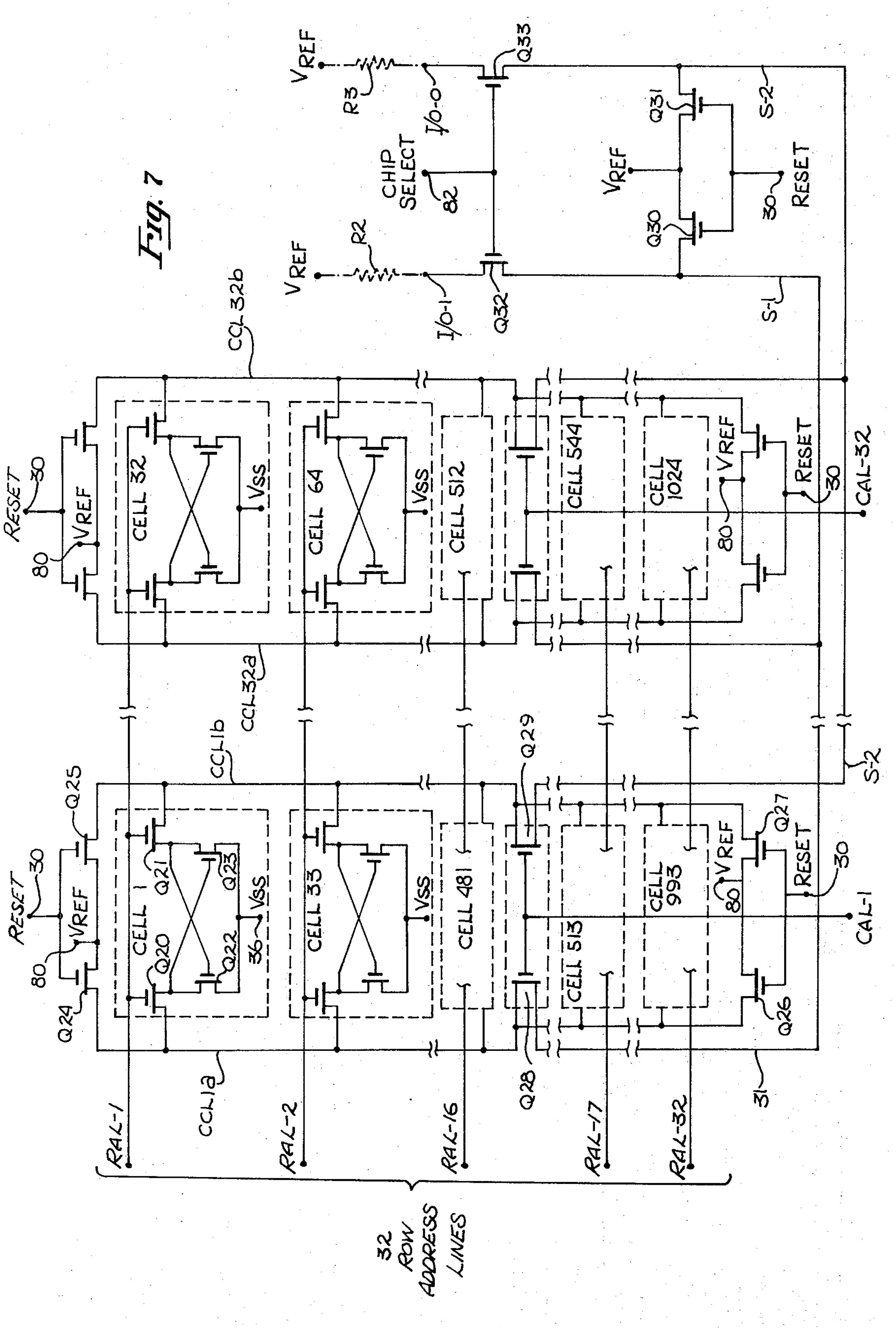
FIG. 7 is a circuit diagram of the memory matrix and support circuitry of the preferred embodiment of the present invention.

Now referring to FIG. 7, a schematic diagram for a typical 1,024 bit memory cell matrix of the present invention may be seen. For purposes of clarity, the complete circuitry for the cell is shown only with respect to four specific cells; that is cells 1, 32, 33 and 64. Certain other cells are indicated by a dashed line enclosure, such as cells 481, 512 etc. The positions of still other cells are suggested by the indication of breaks in the various lines interconnecting cells. A full matrix for such an embodiment actually consists of a 32 × 32 matrix, that is, 32 rows of cells vertically disposed with respect to each other, each row having 32 cells therein.

In the above description of the memory addressing system there is described the manner in which 32 decoded row address signals and 32 column address signals are created. Each of the 32 row address signals are connected to a respective one of lines RAL-1 through RAL-32 in FIG. 7. Also the 32 decoded column address lines are each connected to a respective one of the column address lines CAL-1 through CAL-32.

The basic memory cell, such as cell 1 in FIG. 7, is comprised of a 4 transistor cell, that is, transistors Q20, Q21, Q22, and Q23. The sources of Q22 and Q23 are coupled together and to the positive power supply terminal 36. The drains of Q22 and Q23 are coupled to the sources of Q20 and Q21 respectively, and the gates of Q22 and Q23 are coupled to the drains of Q23 and Q22 respectively. The gates of devices Q20 and Q21 are coupled to a row address line RAL-1 and the drains of devices Q20 and Q21 are coupled to a pair of column cell lines which are designated CCL1*a* and CCL1*b*. The number "1" in the preceding designation indicates the column cell line for the first and second lines of the respective pair of column cell lines for the particular column of memory cells.

The operation of a typical memory cell, such as cell 1, may be described as follows. Terminals 80, identified herein as Vref, are connected to a negative power supply terminal approximately at the voltage of Vdd. The reset connections are connected to terminal 30, as are the various reset terminals of the circuits of FIGS. 3 through 5. Thus, when the reset signal is low, (after time T4 and before time T1)devices Q24 through Q27 (and the equivalent devices in the other columns) are turned on, thereby forcing the column cell lines, such as lines CCL1*a* and CCL1*b* to the low state voltage. When the reset signal returns to the high state at time T1, devices Q24 through Q27 as well as the equivalent devices in each of the other columns are turned off. However, because of the significant capacitance of the column cell lines to the substrate, the lines will remain in the negatively charged state, that is, the low state voltage, for a significant period of time, at least compared to the memory read write cycle time. Thus at time T1, the reset signal turns off devices Q24 through Q27, and subsequently at time T2, assuming the address to be proper, the clock signal causes the row address line RAL-1 to change to the low state (FIG. 2g). This turns on devices Q20 and Q21. Assuming the gate of device Q22 to be in a low state and thus device Q22 to be conducting, the column cell line CCL1*a* will immediately discharge, that is, assume the voltage of terminal 36 through devices Q20 and Q22. Thus, the gate of device Q23 is substantially at the high state, thereby causing device Q23 to be nonconductive so that the column cell line in CCL1*b* remains at the low state.

At the end of the clock signal (time T3) the row address line RAL-1 returns to the high state, thereby turning off devices Q20 and Q21 so as to decouple devices Q22 and Q23 from the column cell lines CCL1a and CCL1b. However, because of the capacitances associated with the gates of devices Q22 and Q23 and the lines coupled thereto, the gates of devices Q22 and Q23 will tend to remain at their established voltages for a period of time, so that recharging the column cell line to the low state voltage by a subsequent reset cycle, followed by a subsequent address of the row address line RAL-1, will again cause device Q22 to be conductive and device Q23 to be non-conductive.

Similarly the opposite state for the cell is with device Q23 conductive and device Q22 non-conductive which state will be similarly capacitively stored and which will automatically be refreshed in the manner hereinabove described. "Refreshing," as used herein, simply indicates the manner in which the gates of the devices in each memory cell corresponding to devices Q22 and Q23 in cell number 1 are recharged either substantially to the reference voltage terminal 80 or to the positive power supply voltage at terminal 36 by the addressing of the cell, prior to the leakage of the voltages stored on the gates of the devices to an indeterminate level following a previous addressing cycle. Thus it may be seen that by addressing any given row address line, all memory cells in the corresponding row are refreshed. While refreshing will naturally result from a read or a write operation in any cell on the corresponding row, normal usage will not insure the addressing of all row lines within the required refresh cycle time period. Consequently, the common manner of usage of the semiconductor memory of the present invention is to periodically, specifically approximately every 2 milliseconds, sequentially address each of the rows so as to refresh all memory cells in the manner hereinabove described. It is to be noted that this is accomplished without requiring a simultaneous column addressing.

As may be seen in FIG. 7, each column of column cell lines has a precharge driver at the top of the column and at the bottom of the column. By way of example, the first column has a precharge driver comprised of devices Q24 and Q25 driven by the reset signal so as to precharge the column cell lines CCL1*a* and CCL1*b* at the desired time during the addressing sequence, and a precharge driver at the bottom comprised of devices Q26 and Q27 identical in circuitry and function as the upper precharge driver. While two such drivers on a particular column are redundant, the use of two provides a better and more symetrical drive to the column cell lines so as to result in faster precharging of the column cell lines to the low state. Thus, precharging is initiated at time T4 and terminated at time T1 of the next addressing cycle.

Each column cell lines is coupled to the source of an MOS device, with the gates of the pair of MOS devices for each cell column being coupled together and to a column address line, (designated CAL-N), and the drains of the MOS devices connected to the sense lines S-1 and S-2. Thus, for the first column, the source of device Q28 is connected to the column cell line CCL1a and the drain of device Q28 is connected to the sense line S-1, while the source of device Q29 is connected to the column cell lines CCL1b and the drain of device Q29 is connected to the sense line S-2. The gates of devices Q28 and Q29 are connected together and to the column address line CAL-1.

As heretofore explained, the address signal for the column address lines is the same in wave form as the address for a row address line as shown in FIG. 2g. Thus, when the addressed column address line signal goes to the low state between time T2 and T3, the corresponding pair of devices such as devices Q28 and Q29 will both be turned on, thereby coupling the respective pair of column cell lines to the sense lines S-1 and S-2. It will be noted that by addressing one row, all of the memory cells in the addressed row are coupled to the corresponding pair of column cell lines. However, all column cell lines except those in the addressed column are decoupled from the sense lines S-1 and S-2, so that the simultaneous addressing of one row and one column results in the addressing of the specific memory cell, and only that memory cell, located at the intersection of the column and row.

It will be noted in the above description of the manner in which the memory cells are refreshed before the information stored therein becomes indeterminate, that the refreshing occurs as the result of precharging of the column cell lines through the coupling of the column cell lines to the reference voltage as part of the read, write or refresh cycle. However, it is to be also noted that in a read or write operation, a particular column is addressed through the corresponding column address line, thereby coupling the sense lines S-1 and S-2 to the column address lines. Consequently to avoid discharge of the column cell lines through the sense lines rather than into the addressed cell, a precharging circuit similar in function and design to those for precharging the column cell lines is provided. This circuit, comprised of devices Q30 and Q31, precharges the sense lines S-1 and S-2 simultaneously with the precharging of the column cell lines as herebefore described.

Also it will be noted that the column clock signal, that is, the chip select signal, is applied through terminal 82 to the gates of devices Q32 and Q33. Thus, when the particular memory matrix is addressed the chip select signal (equivalent to the clock signal for the row addressing system) will clock the decoded column address into the memory matrix so as to address the desired column, and simultaneously will couple sense lines S-1 and S-2 to the input/output terminals I/0-1 and I/0-0. For all nonselected memory matrices, no chip select signal will be provided, thereby resulting in failure to address any column in the nonselected matrices and similarly failing to couple the sense lines of the non-selected memory matrices to the corresponding input/output terminals.

In use, characteristically a plurality of semiconductor memories of the present invention have their respective input/output lines I/0-1 connected together, and similarly have their input/output lines I/0-0 connected together. An external resistor R-2 is connected between the reference voltage and the common or grouped input/output lines I/0-1, and a second resistor R-3 is connected between the reference voltage and the grouped input/output lines I/0-0. Thus in the precharging operations hereinbefore described, the sense lines S-1 and S-2 for each memory matrix are precharged to the reference voltage and will remain at the reference voltage when that particular chip or memory matrix is selected, though the resistors R-2 and R-3, unless driven to a voltage substantially equal to the positive power supply voltage at terminal 36 by the conduction of one of the devices in the addressed memory cell such as by way of example, devices Q22 and Q23. However, since the memory cell is, in essence a bi-stable cell, and because of the connection thereof, one of the column cell lines will be in the high state and the other column cell line must be in the low state for the addressed cell, so that one or the other of the input/output terminals will be driven to the high state as a result of the state of the addressed cell.

Figure 8:
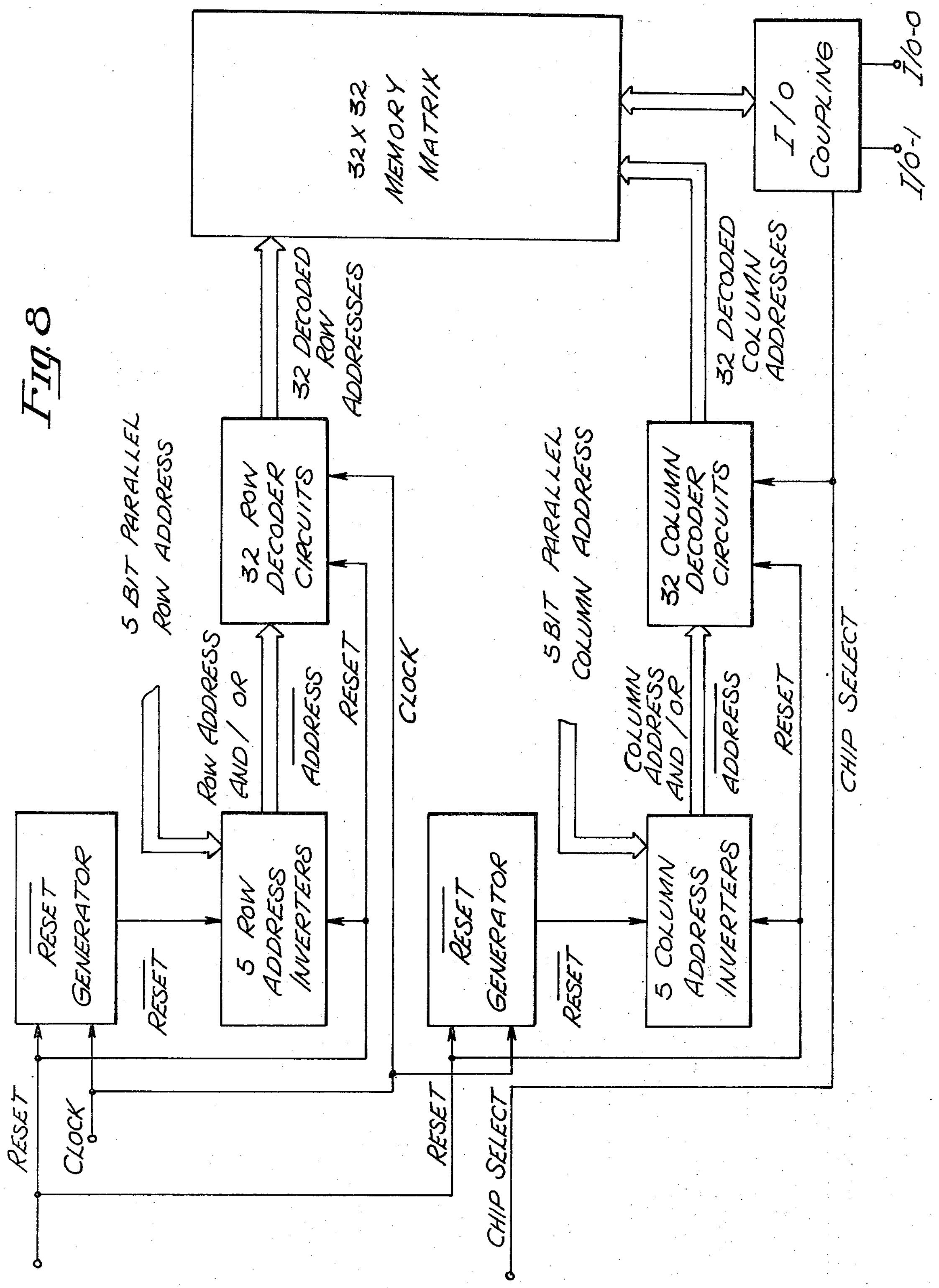
FIG. 8 is a diagram of the entire semiconductor memory of the present invention.

To program the semiconductor memory of the present invention, a particular memory cell is addressed in the manner hereinabove described, and thereafter the input/output terminal which is to be programmed to represent the high state in accordance with the desired programming is coupled to the positive power supply voltage VSS, typically through a bipolar circuit. Thus, by way of example, assume that cell has been addressed, and prior to the application of the programming signal, device Q22 is nonconducting and device Q23 is conducting. Thus resistor R-2 will maintain input/output terminal I/0-1 at the reference voltage, while input/output terminal I/0-0 will be driven to the high state by conduction of devices Q33, Q29, Q21 and Q23. (This will be referred to as the false or low state of the output with the true or high state of the output being represented by a voltage at input/output terminal I/0-1 approximately equal to a positive power supply voltage and the voltage at the input/output terminal I/0-0 equal to the reference voltage). To change the state of cell number 1 from the false state to the true state, input/output terminal I/0-1 is coupled to the positive power supply voltage VSS. Thus the gate of Q23 is coupled to the high state voltage VSS through devices Q20, Q28 and Q32, thereby turning off device Q23. As a result, resistor R-3 charges the sense line S-2 and the column cell line CCL1b to the reference voltage, that is, the low state. Thus, it may be seen that the state of the cell has been changed. Also, it should be noted that while the refreshing operation refreshes the state of the cell prior to decay to an ambiguous state (effectively by the capacitive discharge of one of each pair of column cell lines for the addressed row of cells), when a particular cell is addressed, the addressed cell together with external resistors R-2 and R-3 provide a bi stable flip flop circuit, so that information is not lost in any manner by discharge of components through the external resistors. Further, it will be noted that only the addressed memory cell in the semi-conductor memory which receives the chip select signal will be coupled to resistors R-2 and R-3, so that the voltage on the resistors is determined only by the addressed cell on the selected semiconductor memory. There has been described herein various circuits comprising the addressing system and the memory matrix of the present invention semiconductor memory, together with various other buffer and coupling circuitry which makes up the semiconductor memory. To integrate these various circuits in block form to present the full organization of a preferred embodiment of the present invention, the block diagram of FIG. 8 is presented. In this diagram the blocks indicated by numerals of less than 100 correspond to the various circuits identified and discussed with respect to FIG. 6 and previously described in detail herein. It may be seen that one addressing system as shown in FIG. 6 is used to provide 32 clocked and decoded row addresses for addressing the memory matrix 100, and a second addressing system substantially the same in circuitry, though actuated by the chip select signal rather than the clock signal, is used to address the columns in the memory matrix 100. Thus the inputs to the semiconductor memory are the reset signal and the clock signal as shown in FIG. 2, and a chip select signal which, when the particular semiconductor memory is selected, has substantially the same wave form as the clock signal and which remains in the high state whenever the chip is not selected. The inputs or input-outputs also comprise a 10 bit parallel address signal, five bits of which represent the row address and 5 bits of which represent the column address, and a pair of input/output terminals I/0-1 and I/0-0. Also provided but not shown in FIG. 8 in the preferred embodiment are the positive power supply voltage VSS, the negative power supply voltage Vdd, reference voltage Vref and a substrate connection to provide biasing of the substrate for a proper operation of the semiconductor memory.

There has been described herein a semiconductor memory together with the addressing system and associated circuitry therefor to provide a high speed semiconductor memory, particularly suited for fabrication in integrated circuit form. The semiconductor memory is designed to operate in conjunction with external circuitry for providing a pair of timing signals (reset and clock signals) one of which (clock signal) may be gated to a second connection (the chip select connection) to provide the semiconductor memory selection function. Other external circuitry generally includes circuitry for periodically refreshing the memory, and a sense amplifier for sensing the output on the input/output lines. In regard to the refreshing operation, it is to be noted that refresh is accomplished merely be sequentially addressing each row in each semiconductor memory, a result achieved without selecting the particular semiconductor memory being refreshed. Consequently, all semiconductor memories of the present invention in a memory bank are refreshed simultaneously by row selection and do not require individual refreshing through a simultaneous chip select. In regard to the sense amplifier for sensing the signal on the input/output lines, one particularly desirable such amplifier is that disclosed in a copending application for patent entitled "High Speed Sense Amplifier" invented by Robert C. Lutz and Jerald R. Bernacchi, filed Jan. 31, 1972, Ser. No. 222,148, now U.S. Pat. No. 3,744,103, which application for patent is assigned to the assignee of the present invention. Of course, various changes in one or more of the circuits of the present invention may be made and still achieve the objects of the present invention. Thus, while the invention has been particularly shown and described with reference to a preferred embodiment thereof, it will be understood by those skilled in the art that various changes in form and details may be made therein without departing from the spirit and scope of the invention.

We claim:

1. A memory system comprising a plurality of devices of the insulated gate type whereby conduction between first and second regions in a semiconductor maybe controlled by the voltage on an insulated gate, having;

a plurality of cells electrically arranged in columns and rows, each of said cells having first, second, third and fourth devices, said first and second devices having their first regions coupled to a first power supply connection and their second regions coupled to the first regions of said third and fourth devices respectively, said gates of said first and second devices being coupled to the first regions of said fourth and third devices respectively, the gates of said third and fourth devices being coupled to the row address line for the respective row of cells, said second regions of said third and fourth devices each being coupled to one of a pair of column cell lines for the respective column of cells, means for precharging said column cell lines to a predetermined voltage in response to a first timing signal.

means for coupling each of a selected pair of column cell lines to a respective one of a pair of sense lines responsive to a column address signal applied to respective column address lines.

a plurality of address inverter means, each for receiving and inverting one bit of a multiple bit addressing signal and coupling each said bit and the inverse thereof to first and second address inverter output terminals in response to a second timing signal, reset means for resetting the voltage on each of said address inverter means output terminals to a predetermined voltage level in response to said first timing signal, a plurality of decoder means, each for receiving a signal from a predetermined one of said address inverter output terminals of each of a plurality of said address inverter means and for providing a decoded signal; and coupling means coupled to each said decoder means for receiving said decoded signal and coupling said decoded signal to a decoded output line in response to a timing signal applied thereto, said coupling means and said decoder means being functionally divided into first and second groups, the coupling means of each of said first group being responsive to a third timing signal to couple said decoded signal to a respective one of said row address lines, said coupling means of each of said second group being responsive to a fourth timing signal to couple said decoded signal to a respective one of said column address lines.

2. The memory system of claim 1 further comprised of a means for precharging said sense lines to a predetermined voltage in response to said second timing signal and a means for coupling each of said pair of sense lines to a respective one of a pair of input-output terminals responsive to said fourth timing signal.

3. The memory system of claim 1 wherein said coupling means each comprises fifth and sixth devices, said fifth device having its first region coupled to a line to receive said timing signal, its second region coupled to said decoded output line, and its gate coupled to said second region of said sixth device, said sixth device also having its first region coupled to said decoder for receiving said decoded signal and its gate coupled to a predetermined voltage.

4. The memory system of claim 3 wherein said gate of said fifth device is disposed over a significant area of its said second region so as to substantially increase the capacitance therebetween.

5. A memory system comprising a plurality of devices of the insulated gate type whereby conduction between first and second regions in a semiconductor may be controlled by the voltage on an insulated gate having:

a plurality of memory cell means electrically arranged in columns and rows, each said row and each said column having at least one row line and one column line respectively whereby one said cell may be activated by addressing the respective one said row line and one said column line, a plurality of decoder means, each for receiving a plurality of address signals and for providing a decoded output signal, and a plurality of coupling means each for coupling said decoded output signal of each said decoder to a respective one of said row lines and said column lines, each said coupling means having first and second devices, said first device having its first region coupled to a line to receive a timing signal, its second region coupled to a respective one of said row and column lines, and its gate coupled to said second region of said second device, said second device having its first region coupled to said decoder means to receive one of said decoded output signals and its gate coupled to a predetermined voltage.

6. The memory system of claim 5 wherein said gate of said first device is disposed over a significant area of its said second region so as to substantially increase the capacitance therebetween.

7. A memory system comprising a plurality of devices of the insulated gate type whereby conduction between first and second regions in a semiconductor may be controlled by the voltage on an insulated gate, having:

a plurality of cells electrically arranged in columns and rows, each of said cells having first, second, third and fourth devices, said first and second devices having their first regions coupled to a first power supply connection and their second regions coupled to the first regions of said third and fourth devices respectively, said gates of said first and second devices being coupled to the first regions of said fourth and third devices respectively, the gates of said third and fourth devices being coupled to the row address line for the respective row of cells, said second regions of said third and fourth devices each being coupled to one of a pair of column cell lines for the respective column of cells, means for coupling each of a selected pair of column cell lines to a respective one of a pair of sense lines responsive to a column address signal applied to respective column address lines, a plurality of address inverter means, each for receiving and inverting one bit of a multiple bit addressing signal and coupling each said bit and the inverse thereof to first and second address inverter output terminals in response to a first timing signal, a plurality of decoder means, each for receiving a signal from a predetermined one of said address inverter output terminals of each of a plurality of said address inverter means and for providing a decoded signal, and coupling means coupled to each said decoder means for receiving said decoded signal and coupling said decoded signal to a decoded output line in response to a timing signal applied thereto, said coupling means and said decoder means being functionally divided into first and second groups, the coupling means of each of said first group being responsive to a timing signal to couple said decoded signal to a respective one of said row address lines, said coupling means of each of said second group being responsive to a timing signal to couple said decoded signal to a respective one of said column address lines.

8. The memory system of claim 7 wherein said coupling means each comprises fifth and sixth devices, said fifth device having its first region coupled to a line to receive said timing signal, its second region coupled to said decoded output line, and its gate coupled to said second region of said sixth device, said sixth device also having its first region coupled to said decoder for receiving said decoded signal and its gate coupled to a predetermined voltage.

9. The memory system of claim 8 wherein said gate of said fifth device is disposed over a significant area of its said second region so as to substantially increase the capacitance therebetween.

10. A memory system comprising a plurality of devices of the insulated gate type whereby conduction between first and second regions in a semiconductor may be controlled by the voltage on an insulated gate having:

a plurality of memory cell means electrically arranged in columns and rows, each said row having at least one row line and one column line respectively whereby one said cell may be activated by addressing the respective one said row line, a plurality of decoder means, each for receiving a plurality of address signals and for providing a decoded output signal, and a plurality of coupling means each for coupling said decoded output signal of each said decoder to a respective one of said row lines, each said coupling means having first and second devices, said first device having its first region coupled to a line to receive a timing signal, its second region coupled to a respective one of said row lines, and its gate coupled to said second region of said second device, said second device having its first region coupled to said decoder means to receive one of said decoded output signals and it gate coupled to a predetermined voltage.

11. The memory of system of claim 10 wherein said gate of said first device is disposed over a significant area of its said second region so as to substantially increase the capacitance therebetween.

* * * * *